United States Patent Office 3,843,468
Patented Oct. 22, 1974

3,843,468
METHOD AND APPARATUS OF A TWO ZONED, LIQUID LEVEL CONTROLLED SCREENING AND FEEDING DEVICE FOR CELLULOSE DIGESTION
Oliver A. Laakso, Glens Falls, N.Y., assignor to Kamyr Inc., Glens Falls, N.Y.
Filed Mar. 12, 1973, Ser. No. 339,761
Int. Cl. D21c 7/00, 7/06, 7/12
U.S. Cl. 162—17                         7 Claims

ABSTRACT OF THE DISCLOSURE

A method and apparatus for continuous cellulose digestion comprising the steps of pumping a suspension of finely comminuted fiber material and digesting liquor from a charging valve to a screening device located at the top of the digester and draining fiber material in the screening device in separate first and second zones. The drained fiber material is in turn transferred from the screening device to a steam filled space in the top of the digester, while the first portion of the liquid drained off from the screening device is recirculated to the charging valve and the remaining second portion is heated and supplied to the digester. Apparatus for screening the fiber-liquor mixture is provided with a screen girdle to partially drain the liquor mixture from the fibers and separate the liquor into the two portions.

---

This application is related to ser. No. 339,758, filed on even date herewith by Johan C. F. C. Richter.

The invention relates to cellulose digesting apparatus for the charging of chips to a digester which is in open communication with a separate pressure-resistant vessel containing a screening device which strains a chips-liquid-suspension in order to recycle the liquid, and a feeding device for the transfer of the chips from said vessel to the digester. An example of a digester is shown in U.S. Pat. No. 3,429,773.

The invention is concerned with the problem that cellulose mills often are in continuous expansion, and, therefore, after only a few years production a new digesting plant may have to be increased in capacity. An object of the invention is to effect in a simple manner and at a comparatively small cost, a desired expansion so that cellulose digesting plants can be expanded with the greatest possible use of the equipment already installed, i.e. with as little rebuilding thereof possible. Thus, the invention is directed at using the installed devices for pretreatment of the chips and transportation thereof to the digester top; if at a later stage it is desired to enlarge the digesting plant with one or more further digesters, only simple modifications need be made. These objects are achieved by providing a pressure-resistant vessel with a plurality of chips outlets, each adapted for connection to a separate digester, allowing the plant to be supplemented with one or more additional digesters. Further, a device is provided for the proper distribution of the chips into the outlets employed. According to a preferred embodiment, the upper end of a vertical cylindrical separating shell surrounds a feeder screw coaxial therewith, and feeds the chips upwardly. This upper end is surrounded by a portion of the pressure vessel preferably forming a circular trough with downwardly sloping chips outlet tubes being connected to the bottom of said trough at a level lower than the upper edge of said separating shell, so that chips flowing over said edge are transferred to the digester or digesters substantially by the action of gravity.

The present method and apparatus for continuous cellulose digestion comprises the steps of pumping a suspension of finely comminuted fiber material and digesting liquid from a charging valve to a screening device located at the top of the digester and draining fiber material in the screening device. The drained fiber material is in turn transferred from the screening device to a stream filled space in the top of the digester, while a portion of the liquid drained off from the screening device is mainly recirculated to the charging valve and the remaining portion is heated and supplied to the digester. Apparatus is also provided for screening the fiber-liquor mixture with a screen girdle to partially drain the liquor mixture from the fibers and separate the liquor into the two portions.

BRIEF DESCRIPTION OF THE DRAWINGS

The preferred form of the invention will now be described more particularly with reference to the accompanying drawings, wherein.

DESCRIPTION OF THE PREFERRED EMBODIMENT

Figure 1:
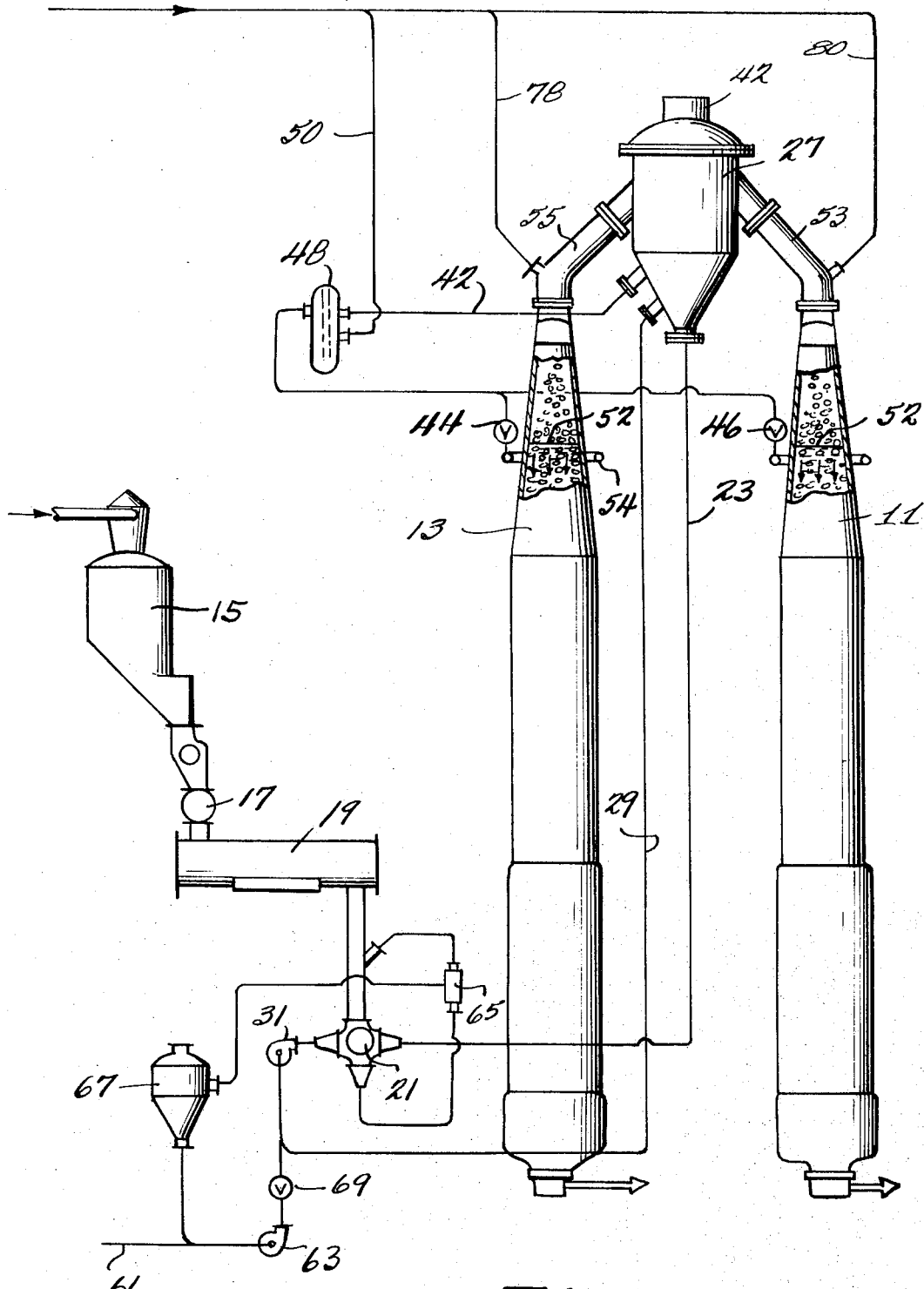
FIG. 1 diagrammatically shows a cellulose digesting apparatus comprising two digesters.

The apparatus shown in FIG. 1 comprises two vertical essentially cylindrical continuous digester 11, 13, the upper ends of which are continuously fed with a mixture of chips and digesting liquor. From the lower ends of the digesters 11, 13 digested and partially washed cellulosic pulp is continuously discharged. The term "chips" is meant to include not only cellulosic fiber materials such as hewn wood chips but also other finely comminuted fiber material, as straw, bagasse, reed, etc. The digested liquor may be of any kind, such as sulphate, sulphite or soda liquor.

The chips are pretreated and distributed to ends of the digesters. Chips from chips bin 15 are fed in the usual manner through a low-pressure valve 17 into a steaming vessel 19 wherein the chips are steamed with low-pressure steam. By means of a high-pressure transfer valve 21, the chips are then transferred to a conduit 23 filled with digesting liquor at approximately the digester pressure. The conduit 23 is connected with the pressure-resistant vessel 27 which encloses a screening device and a chips distributing device. Liquor screened off by said screening device in vessel 27 is returned through the conduit 29 to the high-pressure transfer valve 21. Pump 31 circulates the liquid in a loop over 21, 23, 27 and 29. In said loop the chips are introduced by means of the valve 21, so that the chips, suspended in the liquid, are flushed into the vessel 27 situated at the level of the digester tops, and are delivered and retained therein, whereas the liquid portion of the suspension is separated and re-circulated.

Figure 2:
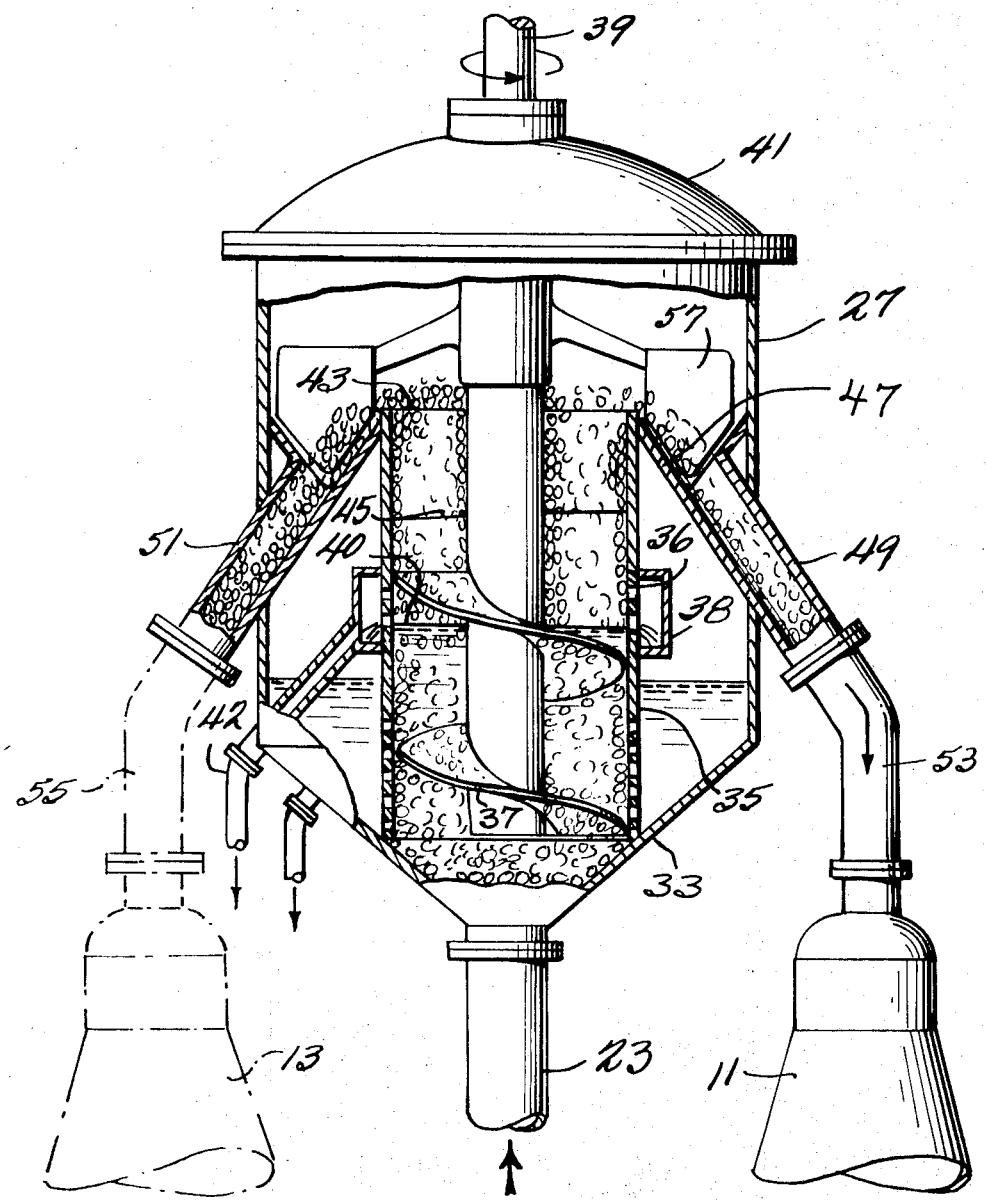
FIG. 2 is a vertical elevational and partially cross-sectional view shown at an enlarged scale, of the screening and chips distributing vessel forming part of said apparatus.

The vessel 27 shown partially in section in FIG. 2, is provided within a pressure-resistant casing 33 and a vertical cylindrical separating shell 35. The lower end of the separating shell 35 is perforated or shaped with slits so as to form a strainer, whereas the uppermost portion of the separating shell is impervious and forms a partition. Inserted into the shell is a feeder screw 37 attached to a vertical shaft 39 which extends through and is sealed to the lid 41 of the casing 33. A motor 42 (FIG. 1) connected to the exterior end of the shaft 39 turns the feeder screw 37 causing the chips-liquor-suspension to move upwardly within the separating shell 35. Excess digesting liquor is drained through the straining apertures of the separating shell to the space between the shell 35 and the casing 33 and then into the conduit 29 back to the high-pressure transfer valve 21, whereas the chips are raised over the edge 43 of the separating shell 35. Usually, in prior art devices, a free liquid surface is maintained at a level 45 which is generally within impervious upper portion of the separating shell. When the chips have been raised above said level, entrained digesting liquor drains off, so that the chips travelling over the edge 43 contain digesting liquor absorbed in the pores of the fiber material or superficially adhered thereto.

Since the chips can absorb only part of said liquor quantity, in prior are devices excess liquor can flow over the edge 43 and might easily be distributed in the wrong proportion into the two or more connected digesters, as evidenced by Ser. No. 339,758. To avoid this problem, according to the present invention the lower portion of the inner separating shell 35, as the first screen girdle, is provided with a second screen girdle 36 with a filtrate collecting chamber 38, so that a free liquid level 40 is maintained substantially below the edge 43. Without this second screen girdle the liquid level would be at the level 45 which permits overflow of excess liquor. From the chamber 38 the liquor flows by gravity through a conduit 42 to the tops of the digesters in the proper proportions determined by the valves 44, 46.

Vessel 27 forms a steam-filled space surrounding the upper edge 43 of the separating shell 35, the lower boundary of which forms a circular launder or trough 47. Said trough 47 extends around the upper edge 43 of the separating shell 35 and has its bottom situated at a lower level than said edge, so that chips fed upwardly through the shell by means of the feeder screw 37, drop over the edge 43 down into the trough 47 by gravity. Connected to the bottom of the trough are at least two downwardly sloping chips outlet tubes 49, 51 which by means of connecting tubes 53 and 55 may be connected to the separate digesters 11 and 13. Said tubes form an open communication between the vessel 27 and the respective operating digester, but it may be advantageous to insert shut-off valves in the conduits 53, 55 in order to be able to operate one digester without interruption when the other is temporarily taken out of operation.

The vessel 27 is provided with a device for distributing the chips upon the chips outlets 49, 51. In the embodiment shown in FIG. 2, said distributing device consists of a scraper attached to the shaft 39 which comprises scraper arms 57 projecting radially across the edge of the separating shell 35 and down into the bottom of the trough 47. Chips that drop over the edge 43 down into the trough 47 are collected by said rotary scraper arms and are carried along until they drop into the chips outlet tubes 49, 51. In the embodiment shown, the chips outlet tubes are diametrically disposed about the periphery of the trough 47 and, therefore, the chips will be distributed into each of the outlets in equal parts. When the digesters are of different sizes or capacities, so that distribution of the chips may be required in different proportions, the location of the outlets on the periphery may be changed accordingly. If, for example, one digester requires twice as many chips as the other, the outlets are placed at an angle of 120 degrees from each other, whereby the scrapers collect and transfer to the larger digester the chips which have dropped into two-thirds of the circumference of the trough, and then collect, and distribute to the smaller digester the chips which have dropped into the remaining one-third of the circumference of the trough. The desired distribution may also be attained by varying the size of the outlets. Variations of both size and angle can be brought about by displaceable lids in the bottom of the trough 47.

The drawings refer to an apparatus comprising two digesters, but the apparatus may be operated with a single digester, as is shown in FIG. 2 by the digester 13 with dash lines. In this latter case the chips outlet 51 is blocked, e.g., by means of a blind flange at its lower end, and the scraper arms 57 are not used for their distributing function, but merely for moving the chips in the trough to the outlet 49.

Of course, the number of chips outlets may be increased and it is possible to use a distributing vessel with three, four or more chips outlets, that are used according to the required output of the digesting apparatus.

The entire quantity of digesting liquor required for the digestion is supplied through the conduit 61 and high-pressure pump 63 after having been mixed with the liquor transferred to the low-pressure side of the transfer valve 21, which is returned via the screening device 65 and the tank 67. The level 40 in the vessel 27 is maintained by control valve 69 and return conduit 29, whereas all of the liquor for the digester passes through vessel 27. Some of the liquor passes directly with the chips over edge 43 and the remaining portion of the liquor for the digester is sent via conduit 42 to heater 48 and then back to the digester. The steam for the digesters is supplied via lines 78 and 80.

In the present invention, a heating apparatus 48 is inserted in the conduit 42 so that the liquor is heated directly by steam supplied by a conduit 50 which may be from the same source that supplies steam for heating the chips in the digester tops via lines 78 and 80. Of course, the apparatus 48 could also be a heat exchanger. The heated liquor is introduced in each digester at or below the liquid level 52 and is distributed over its entire cross-section by a tube 54.

The withdrawal of liquor from the screening device in vessel 27, heating the liquor separately and distributing it over the chips in the digester top is of importance not only when the vessel 27 is a chips distributor connected to two or more digesters, but also when said vessel is connected to a single digester, such as the digesters of U.S. Pat. No. 3,429,773 or 3,532,594. In the operation of these prior art digesters it often happens that the liquid level in the separator cannot be controlled; excess liquor flows over the edge of the chips outlet and forms a core of comparatively cool liquor in the digester, where the fibrous material will be insufficiently digested.

It shall be noted that the additional upper screen 36 provides the advantage that liquor which is heated by steam in 48 is directed to the digester where heat is required, whereas liquor separated off by the lower screen 35 is returned to the transfer valve 21 at a cooler temperature, which is desirable as explained in Pat. No. 3,429,773. Another feature of the present invention is that the heating of the chips takes place above the liquor level in the extended top portion of the shell 35.

The above-described embodiment merely constitutes an example of the application of the invention and may be modified as to its details within the scope of the following claims. Thus, the apparatus can also be operated when the digesting liquor, or the main part thereof, is supplied directly to the digesters and such liquid as is required for suspending the chips and flushing them to the digester tops consists of water, as is the case in prehydrolysis digesters, or of more or less diluted white liquor or black liquor.

What is claimed is:

1. A method for continuous cellulose digestion comprising: Pumping a suspension of finely comminuted fiber material and a digesting liquor from a charging valve to a screening device placed at the top of a digester; draining the liquid from the fiber material in the screening device in separate first and second zones, the second zone being above the first zone to control the liquid level in the screening device; transferring the fiber material by means of a feeding screw to a steam-filled space in the top of the digester after draining the liquid therefrom; recirculating the portion of the liquid drained off by said screening device in said first zone and feeding said portion to said charging valve, removing the second portion of liquid drained off by the screening device in said second zone, heating this removed second portion and supplying said second portion to the digester.

2. A method according to claim 1 wherein the second portion of the liquid drawn off by said screening device is removed in such a quantity, that a free liquid surface is formed in the screening device at a sufficiently low level that the fiber material transferred by said feeding screw to the top of the digester is accompanied merely by absorbed or adhering digesting liquor.

3. A method according to claim 1 wherein the second portion of the liquid drawn off by said screening device is supplied, after being heated, over the entire cross section of the digester at or below the liquid level therein.

4. A cellulose digesting apparatus in which a top portion of at least one vertical digester is in open communication with a pressure-resistant vessel containing a screening device wherein fiber material is strained from a fiber material-liquid suspension provided through a charging conduit from a charging valve to the pressure-resistant vessel, a feeder screw positioned within the screening device and a discharge from said screw to transfer a selected amount of the strained fiber materials from said screening device to the digester, and a first means for collecting a first portion of liquid strained from said fiber material by said screening device, and a second means for collecting a second portion of liquid strained from said fiber material by said screening device, said second portion means allowing maintenance of the liquid level in said vessel below the fiber discharge, said pressure-resistant vessel being equipped with a first conduit for recirculating said first portion of the liquid drawn from the screening device to the charging valve and a second conduit for transferring said second portion of the liquid to the digester.

5. Apparatus according to claim 4 further including a heating device, inserted in said second conduit leading to the digester.

6. Apparatus according to claim 4 wherein an outlet from said screening device is located at a level above the level of the connection of said second conduit to the digester, so that the liquid runs by gravity to the digester.

7. Apparatus according to claim 4 wherein said screening device comprises two screen girdles, a lower one connected to said charging valve via said first conduit and said first collecting means, and an upper one connected to said digester via said second conduit and said second collecting means.

References Cited
UNITED STATES PATENTS

| | | | |
|---|---|---|---|
| 3,429,773 | 4/1965 | Richter | 162—237 |
| 3,007,839 | 7/1959 | Richter | 162—17 |
| 3,785,920 | 1/1974 | Johansen | 162—237 X |

S. LEON BASHORE, Primary Examiner

M. S. ALVO, Assistant Examiner

U.S. Cl. X.R.

162—52, 237, 241, 246, 250; 214—17 C